J.L.Rile . Letter Invoice File &c.

No. 4,577. Reissued Oct. 3, 1871.

Witnesses:

A Bennewendorf.

Wm. H. C. Smith.

Inventor:

J. L. Rile.

PER Munn & Co

Attorneys.

AM. PHOTO-LITHOGRAPHIC CO. N.Y. (OSBORNE'S PROCESS.)

UNITED STATES PATENT OFFICE.

JOHN L. RILE, OF NEW YORK, N. Y.

IMPROVEMENT IN BINDING INVOICE-BOOKS.

Specification forming part of Letters Patent No. 115,896, dated June 13, 1871; reissue No. 4,577, dated October 3, 1871.

*To all whom it may concern:*

Be it known that I, JOHN L. RILE, of the city of New York, in the county and State of New York, have invented a new and useful Improvement in the Manufacture of Letter-Invoices, Files, Scrap-Books, &c.; and I do hereby declare that the following is a full, clear, and exact description thereof, which will enable others skilled in the art to make and use the same, reference being had to the accompanying drawing forming part of this specification.

Figure 1:
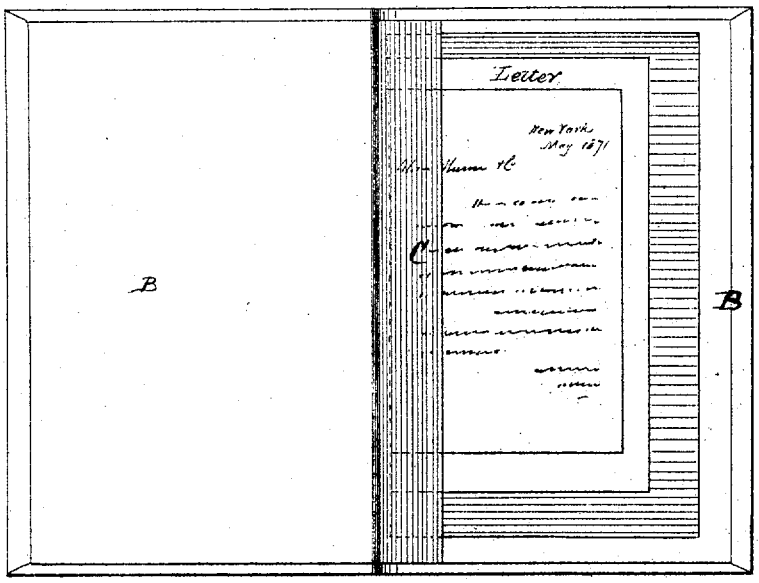
Figure 2:
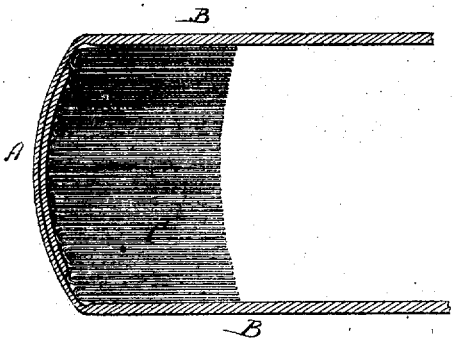
Figure 3:
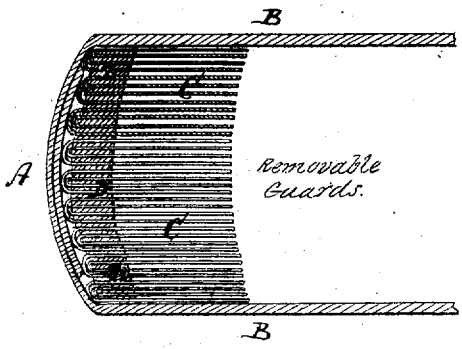

Figure 1 represents a plan view of my improved invoice-file. Fig. 2 is a transverse section of the complete file. Fig 3 is a transverse section of the same, showing it partly completed.

Similar letters of reference indicate corresponding parts.

This invention relates to an improvement in the construction of letter-invoices, files, scrap and invoice-books, pattern-books, and all books prepared for receiving papers and fabrics to be gummed or fastened to blank sheets or strips prepared within the books. The object of the invention is to dispense with the use of the guards or narrow leaves heretofore inserted between the wider leaves of the book or file to give the back a thickness equal to the additional thickness of the wider leaves when the paper or other articles are fastened upon them. My invention consists in substituting for the guards heretofore used strips of card, pasteboard, or other materials of suitable stiffness and thickness, which I place at intervals between the leaves while they are being fastened together into a book, and which, after the back has been properly stiffened in the usual manner, are removed. I am thus enabled to use the same strips over in the manufacture of several books, and obtain the necessary spaces in the back of the book without being obliged to leave guards in the same, as has heretofore been done. The objections to the guard-books formerly made are the expense of the guards used, the labor of applying them, and the room they occupy, space being necessary only in the extreme back; also, the danger of overlapping the guards with the articles inserted, thus destroying their usefulness and unduly straining the covers of the books or files. All of these objections I avoid by using the strips referred to in the manner described. In a book or file made according to my invention the entire surface of the leaves can be used for the purposes intended without difficulty, and will not be interfered with, as heretofore, by guards retained in the book.

A in the drawing represents the back, and B B the sides or covers of the invoice-file or scrap-book. C C are the sheets or narrow strips bound into the book, as usual, to receive and hold the papers or pieces of fabric to be fastened in the book. D are strips put between the leaves while the same are being bound into the book, thereby providing the requisite space between them, and removed when the book has been completed far enough to dispense with their further use. This enables the papers or sample-fabrics to be put between the leaves C as far as may be desired, the back having, by the removed strips, been properly prepared for receiving the additional thickness. In this manner all the objections to and defects of the ordinary file or sample-books are overcome without adding to the expense or trouble of making or using the same.

Having thus described my invention, I claim as new and desire to secure by Letters Patent—

The method of making file, sample, and scrap-books by the use of strips placed therein, and afterward taken therefrom in the process of manufacture, to be further employed in the making of other similar file, sample, or scrap-books, as specified.

JOHN L. RILE.

Witnesses:
GEO. W. MABEE,
T. B. MOSHER.